Feb. 16, 1971            H. FLEISSNER            3,563,065
APPARATUS FOR THE WET-TREATMENT OF LIQUID-PERMEABLE MATERIALS
Filed Sept. 21, 1967
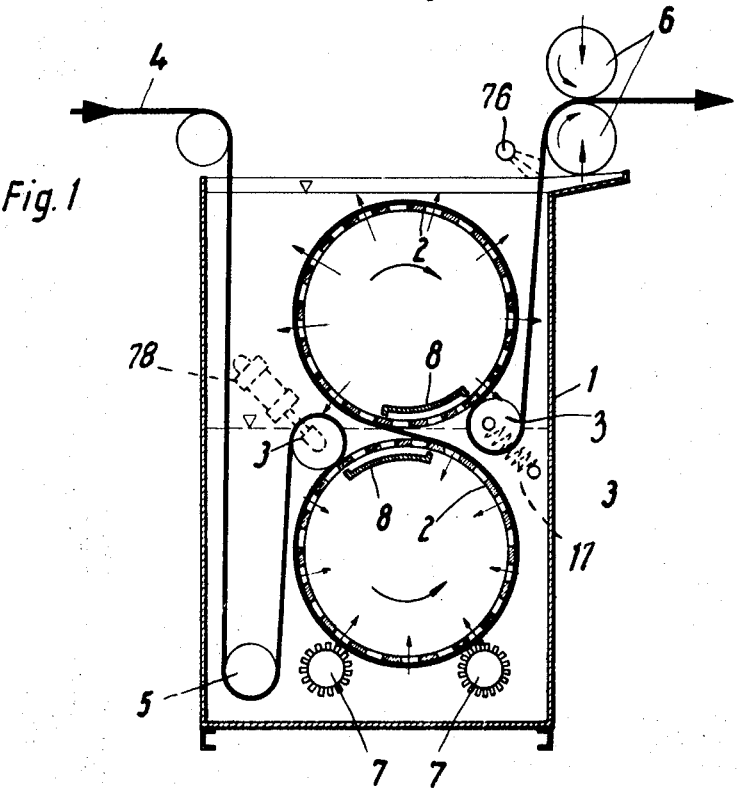
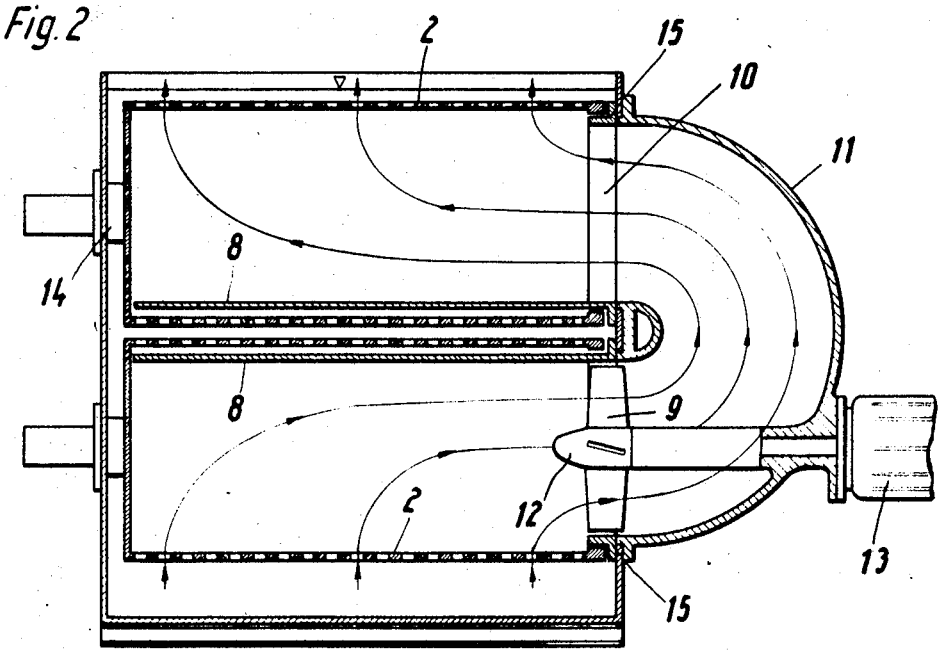
Inventor:
HEINZ FLEISSNER
BY: Craig e Antonelli
ATTORNEYS United States Patent Office 3,563,065
Patented Feb. 16, 1971

3,563,065
APPARATUS FOR THE WET-TREATMENT OF
LIQUID-PERMEABLE MATERIALS
Heinz Fleissner, Egelsbach, near Frankfurt am Main,
Germany, assignor to Vepa AG, Basel, Switzerland
Filed Sept. 21, 1967, Ser. No. 669,573
Claims priority, application Germany, Sept. 24, 1966,
V 32,012
Int. Cl. D06f 31/00
U.S. Cl. 68—22                                    15 Claims

ABSTRACT OF THE DISCLOSURE

The present disclosure relates to a process and apparatus for the wet-treatment of liquid-permeable materials such as tow, slivers, yarn, woven and knitted fabrics, needled felts and tufteds, non-wovens and the like. More particularly, the present invention concerns a process and apparatus for the wet-treatment of textile materials wherein the material being treated is passed on an extended path through the treatment bath thus exposing said material to the influence of the treatment liquid for a longer period of time without substantially increasing the space required for such treatment devices.

BACKGROUND OF THE INVENTION

The present invention relates to a process and apparatus for the wet-treatment, preferably for washing or impregnating liquid-permeable materials, such as tow, slivers, yarn, woven and knitted fabrics, needled felts and tufteds, non-wovens and the like in a running length. More particularly, the present invention concerns an apparatus comprising a container which is at least partially filled with a treatment liquid and which contains sieve drums through which the treatment liquid flows and upon which the material being treated is conveyed through the treatment liquid.

It is well known to treat materials continuously in sieve drum wash bowls. With the known devices, one or several sieve drums subjected to a suction draft which are either completely immersed in the treatment liquid or only partially immersed in the treatment liquid are arranged one behind the other in one treatment bath. By using the suction draft of the sieve drums the liquor is, with these devices, drawn through the material and thus said material is intensely wetted and cleaned in a washing process. With high speeds and in order to obtain good results, it is desirable if the material dwells in the bowl for a certain length of time. However, the known sieve drum wash bowls have a relatively short immersion path, that is the material is exposed to the influence of the treatment liquor for only a relatively short length of time.

SUMMARY OF THE INVENTION

An object of the present invention is to avoid the prior are disadvantages in the treatment of materials, for example washing or impregnating liquid-permeable materials.

Another object of the present invention is to provide an improved process and apparatus for washing or impregnating liquid-permeable textile materials wherein the material being treated is exposed to the influence of the treatment liquid for a longer period of time.

A further object of the present invention is to provide an improved process and apparatus for the wet-treatment of liquid-permeable materials wherein increased contact of the material being treated with the treatment liquid can be provided without substantially increasing the space required for the treatment apparatus.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Pursuant to the present invention, it has been found that the above-mentioned disadvantages may be eliminated and a much improved process and apparatus for the wet-treatment of liquid-permeable materials can be obtained by arranging at least two sieve drums one above the other in a container. In order to have the sieve drums substantially embraced by the material as much as possible during the treatment process, guide rollers are correlated to the sieve drums at both sides and near the passage of the material from one sieve drum to the next sieve drum.

If the apparatus of the present invention is used for washing out auxiliary agents and unfixed dyestuffs in printing processes, it is advantageous to correlate to one sieve drum at least one brush roller which detaches adhering substances in a purely mechanical manner.

It is possible to design the two sieve drums as sieve drums subjected to a suction draft. However, it is also possible to subject the two sieve drums to a pressure so that the liquid flows out of the sieve drums through the lengths of material into the bowl.

An especially advantageous design of the apparatus of the present invention results if one of the two sieve drums is subjected to a suction draft and the other one to a pressure. In this case it is possible to force the liquid drawn out of one sieve drum into the other sieve drum and to produce a liquid circulation in this way. With this design only one pumping device is necessary for the two sieve drums.

In a further embodiment of the present invention it is suggested to subject the lower sieve drum to a suction draft and to subject the upper sieve drum to pressure. In this case it is possible to lower the liquid level in the bowl considerably so that the upper sieve drum is situated at least partially and preferably substantially outside the treatment bowl, that is outside the treatment liquid. With this particular design of the apparatus a very small liquor quantity is sufficient.

The washing effect can be improved if the guide rollers which are correlated to the sieve drums are designed as squeeze rollers which are forced against the sieve drum, so that the treatment effect is improved by the squeezing action in addition to the penetration of the material with the treatment liquor. The guide rollers may be forced against the sieve drums by spring action or hydraulically.

The immersion path of the material can be substantially extended by the arrangement of at least one further guide roller in front of and/or behind the sieve drums.

If the apparatus is used as a washing device, the cleaning effect can be increased if the material is sprayed or jetted with liquid, preferably with fresh water outside of the treatment liquid, advantageously immediately in front of the exit squeezer. Jetting can be effected from one side or from both sides of the material. Through jetting, the solid substances adhering to the material which have not yet been detached from the material can be removed.

BRIEF DESCRIPTION OF THE DRAWINGS

The present invention will become more fully understood from the detailed description given hereinbelow and the accompanying drawings which are given by way of illustration only and thus are not limitative of the present invention and wherein:

FIG. 1 is a section of the apparatus of the present invention taken transversely to the drum axis; and FIG. 2 is a section of the apparatus of the present invention taken in the direction of the drum axis of the apparatus according to FIG. 1.

DESCRIPTION OF THE PREFERRED EMBODIMENTS

Referring now to the drawing wherein like reference numerals are used throughout the various views to designate like parts, the apparatus of the present invention comprises a liquid container 1 in which two sieve drums 2 are arranged one above the other. Two guide rollers 3 are synchronized to the sieve drums 2 in order to insure that the sieve drums are substantially embraced by a length of material 4. Said guide rollers may be forced against the sieve drum by spring means 17 or by hydraulic means 18. Another guide roller 5 insures a longer immersion path of the length of material 4 before it is passed to the sieve drums. At the discharge end of the apparatus a squeezer 6 is correlated to the apparatus in order to substantially dehydrate the material before it is passed into another bowl or into another treatment device, for example a dryer. Brush rollers 7 increase the treatment effect. The passage of the treatment liquid into the sieve drums is prevented by the use of baffle means at that portion of each sieve drum 2 which is not covered with the material being treated.

In the embodiment of the invention shown the sieve drums 2 have at one face a discharge opening 9 and/or an inlet opening 10 (see FIG. 2). By means of an element 11 desigend as a pipe knee, the two openings 9 and 10 are connected with each other. In element 11 a pump 12 is mounted which is arranged in the discharge opening 9 of the lower sieve drum 2. A motor 13 for pump 12 is flange-mounted at the outside of element 11. By changing the sense of rotation of the pump, it is possible to subject the lower sieve drum to a pressure and the upper sieve drum to a suction draft.

The sieve drums 2 are supported at one side by a centrally located trunnion 14 and at the other side on a raceway 15 in the embodiment of the invention shown. The baffle 8 is fastened, for example welded to the raceway 15.

In many cases it is advantageous if both sieve drums 2 are covered by the treatment liquid. In this case the pump must only overcome the resistance offered by the material. If, however, only a very small liquor quantity is to be used, the liquid level can be lowered, for example to the dashed line in the drawing. In the case of this embodiment the pump must overcome the level difference in addition to the resistance offered by the material.

Several of such units of two superimposed sieve drums may be accommodated in one treatment bath. However, in many cases it will be more expedient to arrange several of the treatment baths as shown one behind the other, with two sieve drums each. When arranging several of such baths one behind the other, the liquor exchange may be effected on the counter-current principle or it is also possible to work with varying liquor concentrations.

If the apparatus is used as a washing device, the cleaning effect can be increased if the materials are sprayed or jetted with liquid, preferably with fresh water outside of the treatment liquid, advantageously immediately in front of the exit squeezer. Spray means 16 can be effectively used for this purpose.

The invention being thus described, it will be obvious that the same may be varied in many ways. Such variations are not to be regarded as a departure from the spirit and scope of the invention, and all such modifications are intended to be included within the scope of the following claims.

We claim:

1. An apparatus for the wet-treatment of materials which comprises a container means which is at least partially filled with a treatment liquid, at least two sieve drum means rotatably disposed in said container means and arranged one above the other, inlet means for introducing the material to be treated into the container means, guide roller means associated with each of the sieve drum means near the point of passage of the material from one sieve drum means to the next sieve drum means and means for removing the treated material from the container means.

2. The apparatus of claim 1 wherein at least one brush roller is correlated to at least one sieve drum means.

3. The apparatus of claim 1 wherein means are provided to connect two sieve drum means with each other so that the treatment liquid drawn out of one sieve drum means is forced into the other sieve drum means.

4. The apparatus of claim 3 wherein pump means are associated with lower sieve drum means, such that said lower sieve drum means is subjected to a suction draft and the upper sieve drum means is subjected to a pressure.

5. The apparatus of claim 4 wherein the upper sieve drum means is disposed in the container means substantially outside of the treatment liquid.

6. The apparatus of claim 1 wherein the guide roller means are squeeze rollers which are in pressure contact with the surface of the sieve drum means.

7. The apparatus of claim 6, wherein the guide roller means are forced against the sieve drum means by spring means or hydraulic means associated with said guide roller means.

8. The apparatus of claim 1 wherein at least one additional guide roller means is disposed in the container means below the treatment liquid level to extend the immersion path of the material being treated.

9. The apparatus of claim 1 wherein the means for removing the material from the container are squeezer means.

10. The apparatus of claim 9 wherein spray means are provided outside of the treatment liquid in front of the exit squeezer means.

11. The apparatus of claim 1 wherein pump means are associated with the sieve drum means such that said drum means are subjected to a suction draft.

12. The apparatus of claim 1 wherein pump means are associated with the sieve drum means such that said sieve means are subjected to a pressure.

13. The apparatus of claim 1 wherein pump means are associated with the sieve drum means such that one sieve drum means is subjected to a suction draft and one sieve drum means is subjected to a pressure.

14. An apparatus for the wet-treatment of textile materials which comprises a container means which is at least partially filled with a treatment liquid, two sieve drum means rotatably disposed in said container means and arranged one above the other, inlet means for introducing the material to be treated into container means, guide roller means associated with each of the sieve drum means near the point of passage of the material from one sieve drum means to the next sieve drum means, means for connecting the sieve drum means with each other at one end so that the treatment liquid drawn out of one sieve drum means is forced into the other sieve drum means, pump means disposed in the wall of the connecting means and associated with the lower most sieve drum means and squeeze roller means for removing the treatment liquid while removing the material from the apparatus.

15. The apparatus of claim 14 wherein at least one additional guide roller means is disposed in the container means below the treatment liquid level to extend the immersion path of the material being treated.

References Cited

UNITED STATES PATENTS 3,011,328  12/1961  Fleissner _____ 68—184X

FOREIGN PATENTS 515,552  2/1955  Italy _____ 8—156
632,422  1/1962  Italy _____ 68—27

WILLIAM I. PRICE, Primary Examiner

U.S. Cl. X.R.

68—27, 184